UNITED STATES PATENT OFFICE.

GEORGE E. E. SPARHAWK AND MILETUS A. BALLARD, OF GAYSVILLE, VERMONT.

IMPROVEMENT IN FERTILIZERS.

Specification forming part of Letters Patent No. 155,341, dated September 22, 1874; application filed April 7, 1874.

*To all whom it may concern:*

Be it known that we, GEORGE E. E. SPARHAWK and MILETUS A. BALLARD, both of Gaysville, in the county of Windsor, State of Vermont, have invented a certain new and useful Improvement in Fertilizers, of which the following is a description sufficiently full, clear, and exact to enable any person skilled in the art or science to which our invention appertains to make and use the same.

Our invention relates more especially to that class of fertilizers which are used for top-dressing; and consists in a composition formed by mixing various ingredients, in the manner and proportions hereinafter set forth, by which a better article of this character is produced than is now in common use.

To prepare our improved fertilizer, take two and one-half bushels of air-slaked lime, two and one-half bushels of wood-ashes, two and one half bushels of hen-guano, two and one-half bushels of soil or well-rotted sod, two hundred pounds of gypsum or Onondaga plaster, one bushel of salt, and ten pounds of bone-dust. These ingredients should be pulverized and thoroughly incorporated, and may then be put up in barrels ready for use. The above quantity is sufficient to top-dress one-half acre of land in a thorough and efficient manner.

We are aware that guano, salt, and lime have been mixed to form a fertilizer, and therefore do not claim, broadly, a compound composed of those ingredients; but

What we claim is—

The fertilizer described, consisting of the ingredients named, compounded substantially as and for the purpose specified.

GEORGE E. E. SPARHAWK.
MILETUS A. BALLARD.

Witnesses:
M. E. SMITH,
J. J. SALTERY.